United States Patent [19]

Jones

[11] Patent Number: 4,657,573
[45] Date of Patent: Apr. 14, 1987

[54] MOULD ARRANGEMENT FOR A GLASSWARE FORMING MACHINE

[75] Inventor: Stanley P. Jones, Tickhill, United Kingdom

[73] Assignee: Emhart Industries, Inc., Farmington, Conn.

[21] Appl. No.: 829,370

[22] Filed: Feb. 13, 1986

[30] Foreign Application Priority Data

Feb. 13, 1985 [GB] United Kingdom ............... 8503694

[51] Int. Cl.⁴ ................................................ C03B 9/20
[52] U.S. Cl. .................................... 65/265; 65/267; 65/319; 65/356
[58] Field of Search ................... 65/265, 267, 319, 356

[56] References Cited

U.S. PATENT DOCUMENTS

| | | | |
|---|---|---|---|
| 3,094,404 | 6/1963 | Lauck | 65/319 |
| 4,251,253 | 2/1981 | Becker et al. | 65/319 X |
| 4,388,099 | 6/1983 | Hermening et al. | 65/319 X |
| 4,502,879 | 3/1985 | Foster | 65/319 X |
| 4,557,744 | 12/1985 | Fenton et al. | 65/265 X |
| 4,579,576 | 4/1986 | Jones | 65/319 |

Primary Examiner—Arthur Kellogg
Attorney, Agent, or Firm—H. Samuel Kieser

[57] ABSTRACT

The mould arrangement comprises a mould (10) comprising a bottom plate (12) and two side portions (16,18). When the side portions (16,18) are in a first, closed, or a second, open, position thereof, cooling passages (20) formed therein communicate with exits (28) of a plenum chamber (24) beneath the bottom plate (12) so that cooling air can flow from the chamber and through the passages. The exits (28) of the chamber (24) are formed in a distribution plate (26). At least one air supply passage (50; 70) extends in the thickness of the distribution plate (26) to supply air to one or more further cooling passages (60; 80) in the side portions (16,18) to give enhanced cooling in selected regions.

2 Claims, 3 Drawing Figures

MOULD ARRANGEMENT FOR A GLASSWARE FORMING MACHINE

BACKGROUND OF THE INVENTION

This invention is concerned with a mould arrangement for use in a cyclically operating glassware forming machine, the arrangement comprising a mould comprising a bottom plate defining a bottom portion of a cavity of the mould in which molten glass is moulded in the operation of the machine, and two side portions defining side portions of the cavity, each side portion being movable in a cycle of operation of the machine to a first portion thereof in which it engages the bottom plate and the other side portion to co-operate in defining a mould cavity so that moulding can take place and to a second position thereof in which the side portions are separated to allow moulded glass to be removed from the mould cavity, the side portions also defining cooling passages passing upwardly through the side portions through which air can pass to cool the side portions, the cooling passages in each side portion each having an entrance in a bottom surface of that side portion, and the mould arrangement also comprising a plenum chamber extending beneath the first or the second position of each side portion and having one or more exits which open upwardly and communicate, when the side portion is above the plenum chamber, either directly or through vertical passages in the bottom plate, with the entrances of the cooling passages so that air is supplied to each cooling passage at substantially the same pressure, the plenum chamber also having an entrance connected to air supply means operable to blow air into the plenum chamber. Examples of such mould arrangements are described in detail in the specification of European Patent Application No. 0102820. Such a mould arrangement allows the passages in the side portions of the mould to be supplied with cooling air at a substantially uniform pressure and with a uniform flow pattern.

Mould arrangements as described in the last preceding paragraph have proved extremely successful in use but there are cases in which it is not possible to provide adequate cooling to all parts of the mould. For example, where containers of large diameter or of large width are being manufactured, the thickness of the mould near the joining line of the side portions of the mould has to be restricted in order to enable the mould to be fitted on to the fixed centres of the machine on which the mould arrangement is used. This is normally achieved by cutting away the side portions of the mould in a plane approximately at right angles to the joining line of the side portions. This results in the thickness of the mould in this region often being insufficient to enable cooling passages of sufficient size to give adequate cooling to be provided. Another example is the manufacture of large bottles in a mould containing more than one mould cavity so that there is a web of metal between the two cavities which is frequently thin so that sufficiently large cooling passages cannot be provided in this region.

It is an object of the present invention to provide a mould arrangement in which adequate cooling can be provided in regions where it cannot presently be so provided in the aforementioned mould arrangement.

BRIEF SUMMARY OF THE INVENTION

The invention provides a mould arrangement for use in a cyclically operating glassware forming machine, the arrangement comprising a mould comprising a bottom plate defining a bottom portion of a cavity of the mould in which molten glass is moulded in the operation of the machine, and two side portions defining side portions of the cavity, each side portion being movable in a cycle of operation of the machine to a first position thereof in which it engages the bottom plate and the other side portion to co-operate in defining the mould cavity so that moulding can take place and to a second position thereof in which the side portions are separated to allow moulded glass to be removed from the mould cavity, the side portions also defining cooling passages passing upwardly through the side portions through which air can pass to cool the side portions, the cooling passages in each side portion each having an entrance in a bottom surface of that side portion, and the mould arrangement also comprising a plenum chamber extending beneath the first or the second position of each side portion and having one or more exits which open upwardly and communicate, when the side portion is above the plenum chamber, either directly or through vertical passages in the bottom plate, with the entrances of the cooling passages so that air is supplied to each cooling passage at substantially the same pressure, the plenum chamber also having an entrance connected to air supply means operable to blow air into the plenum chamber, wherein the exit or exits of the plenum chamber are formed in a distribution plate which extends above the plenum chamber and beneath the bottom plate and at least one air supply passage extends in the thickness of the distribution plate from a connection with further air supply means operable to blow air into the air supply passage and an exit defined by the distribution plate which opens upwardly and communicates, when a side portion is above the plenum chamber, either directly or through a vertical passage in the bottom plate, with one or more further cooling passages in the side portion.

In a mould arrangement according to the last preceding paragraph, the further air supply means can operate at a higher pressure than the first-mentioned air supply means so that a greater flow of cooling air through the further cooling passage is achieved than is achieved in the first-mentioned cooling passages. Thus, a greater cooling effect can be achieved with passages of the same diameter or the same cooling effect can be achieved with a passage of a smaller diameter. Thus, the further passage can be located in a region where there is insufficient room for a cooling passage of larger diameter and the same or greater cooling effect achieved.

In order to minimise the effect of the thicker distribution plate on the cooling passages supplied with air from the plenum chamber, the distribution plate may be of reduced thickness in the regions where the exit or exits of the plenum chamber are formed. The pressure of the further air supply means can be adjusted to give adequate cooling and the amount of cooling can be controlled by using valves to switch the air supply on and off as required.

BRIEF DESCRIPTION OF THE DRAWINGS

There now follows a detailed description, to be read with reference to the accompanying drawings, of a mould arrangement which is illustrative of the invention. It is to be understood that the illustrative mould arrangement has been selected for description by way of example and not of limitation of the invention.

In the drawings.

DETAILED DESCRIPTION OF PREFERRED EMBODIMENT OF THE INVENTION

Figure 1:
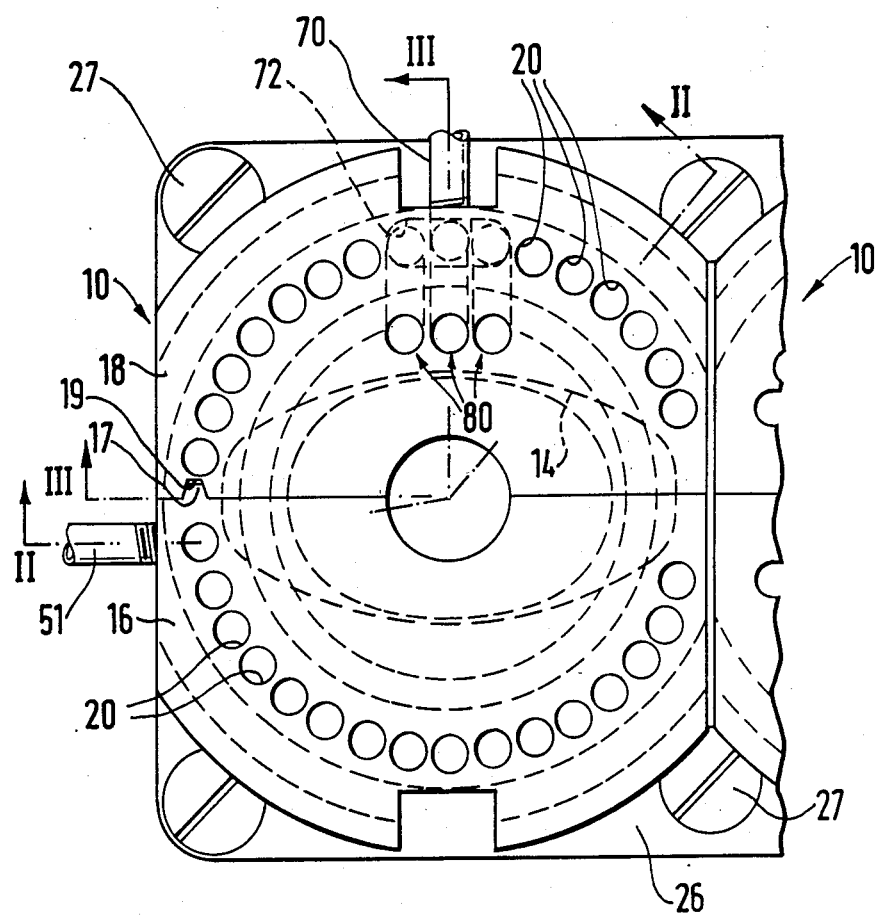
FIG. 1 is a plan view of the illustrative mould arrangement.
Figure 2:
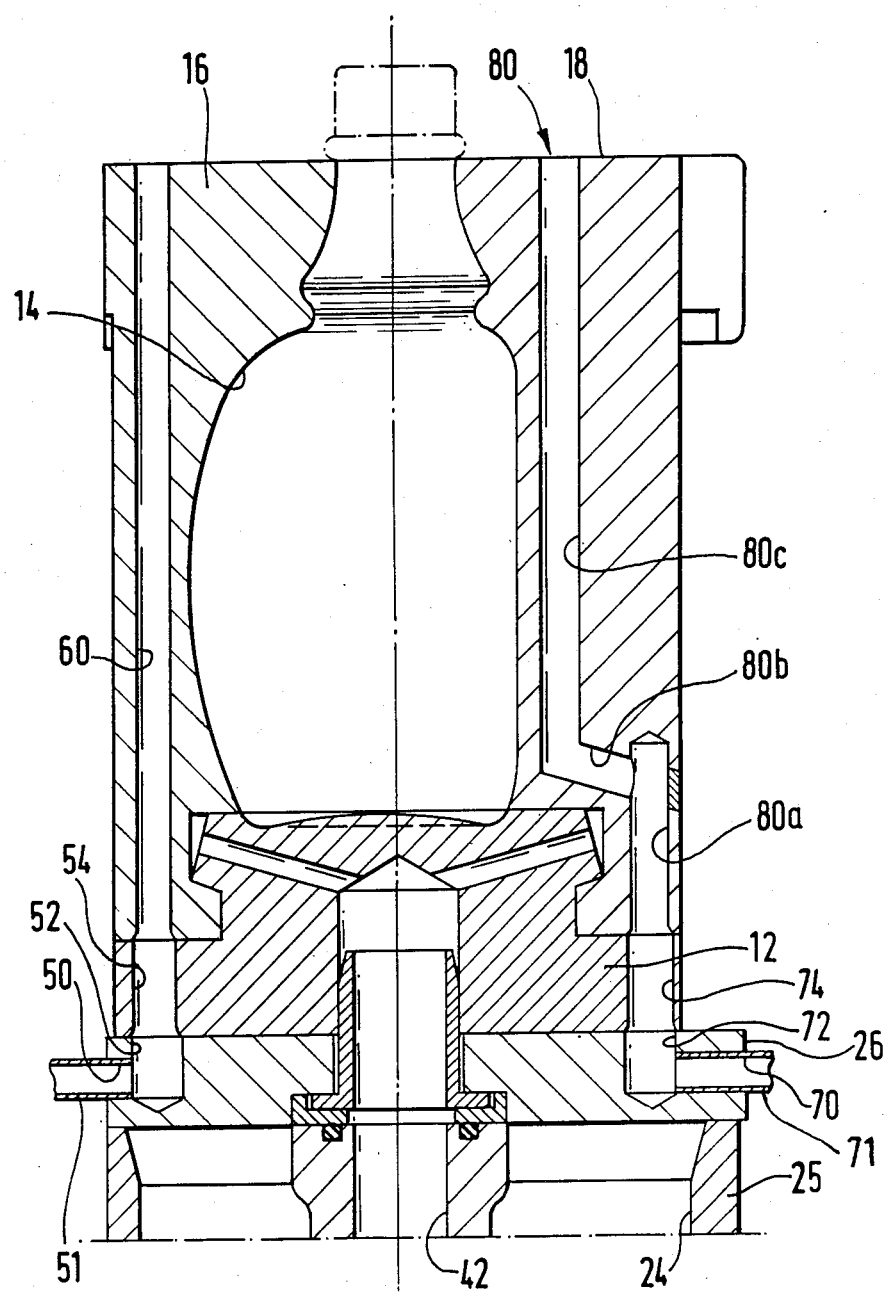
FIG. 2 is a cross-sectional view taken on the line II—II in FIG. 1.

The illustrative mould arrangement shown in the drawings comprises two identical moulds 10 but only one of the moulds is shown in detail in the drawings. The moulds 10 are arranged side by side along a longitudinal axis of a section of a cyclically operating glassware forming machine of the individual section type. The illustrative mould arrangement is mounted on a frame of the machine (not shown) in the manner illustrated in European Patent Specification No. 0102820 with reference to FIG. 4 thereof. Each mould 10 comprises a bottom plate 12 defining a bottom portion of a mould cavity 14 of the mould 10 in which molten glass is moulded in the operation of the machine. The mould 10 also comprises two side portions 16 and 18 which are movable in a cycle of operation of the machine to a first position thereof (shown in the drawings) in which each side portion 16 and 18 engages the bottom plate 12 and the other side portion to co-operate in defining the mould cavity 14 so that moulding can take place. When the side portions 16 and 18 are in their first position, a tongue 17 of the portion 16 enters a slot 19 in the portion 18 to assist in locating the portions 16 and 18 relative to one another. The side portions 16 and 18 are also movable to a second position thereof in which the side portions are separated to allow moulded glass to be removed from the mould cavity 14. The side portions are moved into their second position by being moved directly away from each other by well-known means.

The side portions 16 and 18 also each define a plurality of cooling passages 20 which pass upwardly through the side portions 16 and 18. Air can pass through the passages 20 to cool the side portions 16 and 18. Each cooling passage 20 has an entrance at a bottom surface 22 of the side portions 16 or 18 in which the passage is formed.

Figure 3:
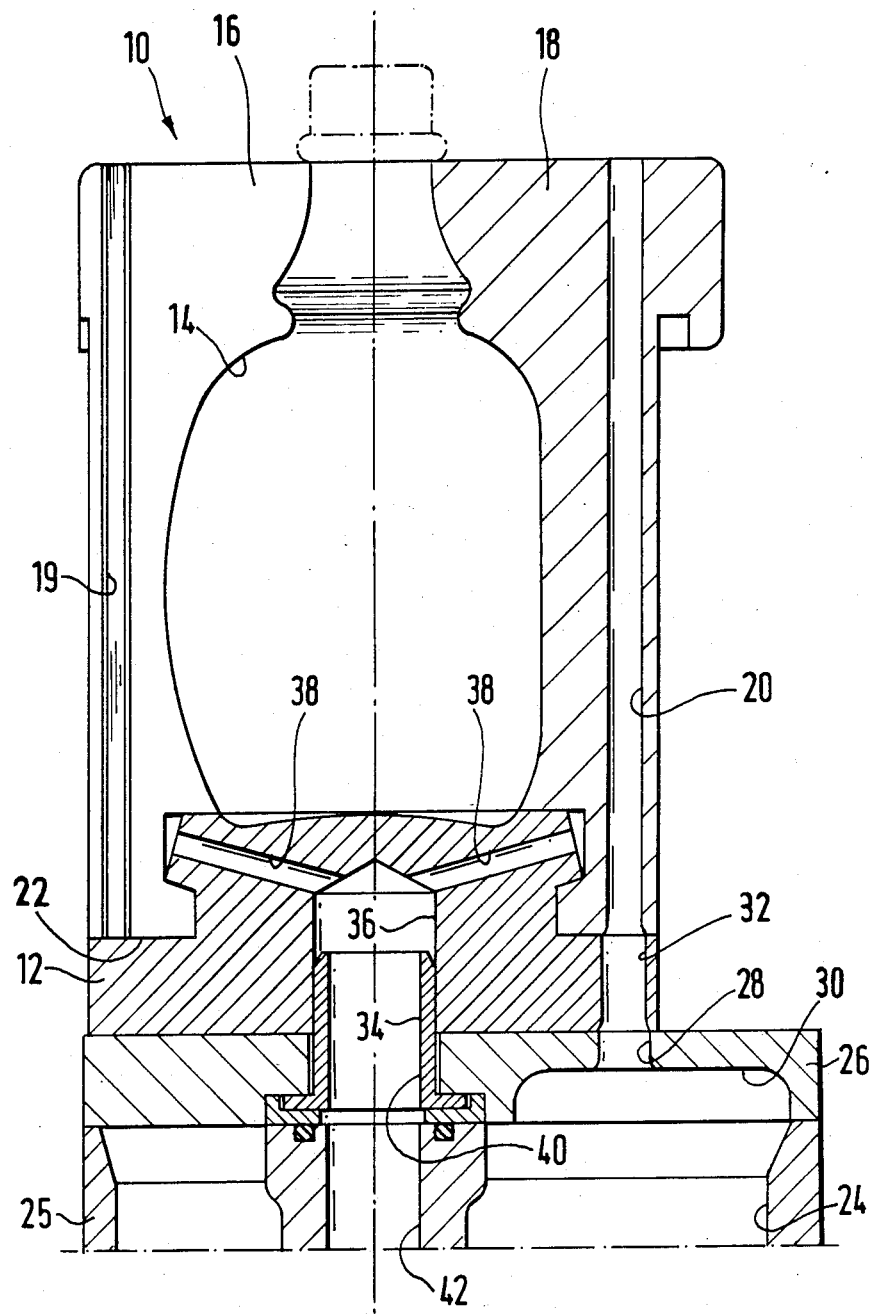
FIG. 3 is a cross-sectional view taken on the line III—III in FIG. 1.

The illustrative mould arrangement also comprises two plenum chambers 24 (similar to the plenum chambers 128 and 130 shown in FIG. 4 of the aforementioned European Patent Specification No. 0102820). Each plenum chamber 24 extends beneath the first position of each of the side portions 16 and 18 of one of the moulds 10 but, in a mould arrangement similar to the illustrative mould arrangement, plenum chambers may be provided which extend beneath the second positions of the side portions 16 and 18. Each plenum chamber 24 is bounded at the top end thereof by a distribution plate 26 of the mould arrangement which extends above both the plenum chambers 24 and beneath the bottom plates 12, the bottom plates 12 being mounted on top of the distribution plate 26. The distribution plate 26 is secured to side walls 25 of the plenum chambers 24 by screws 27. The distribution plate 26 defines a plurality of exits from each plenum chamber 24, there being one exit for each of the cooling passages 20. It is, however, possible to provide a single exit from the plenum chamber in a form of a slot which will correspond to all the cooling passages 20 in one of the moulds 10. Each exit 28 of the plenum chamber is formed in an area of reduced thickness 30 of the distribution plate 26 (see FIG. 3) so that flow of air from the plenum chamber 24 through the exits 28 is facilitated.

Each exit 28 of each plenum chamber 24 opens upwardly and communicates, when the side portions 16 and 18 are above the plenum chamber in their first position, through a vertical passage 32 in the bottom plate 12, with the entrance of one of the cooling passages 20. In some cases, however, the exits 28 may communicate directly with the entrances of the passages 20 where the shape of the bottom plate and of the side portions 16 and 18 permits this. The illustrative mould arrangement also comprises air supply means (not shown) in the form of a fan operable to blow air into an entrance (not shown) of each plenum chamber 24 and this air is supplied to the cooling passages 20 through the exits 28 at substantially the same pressure to each cooling passage 20. The air when passes upwardly through the cooling passages 20 and exhausts to atmosphere through exits of the cooling passages in upper surfaces of the side portions 16 and 18.

Each bottom plate 12 is mounted on the distribution plate 26 by means of an adaptor 34, mounted in a hole through the distribution plate 26, which is received in a recess 36 in the bottom of the bottom plate 12. The recess 36 is connected to passages 38 in the bottom plate through which air may be evacuated from the mould. The air is sucked through the passages 38 into the recess 36 and then through a passage 40 in the adaptor 34 which communicates with a vacuum pipe 42 which passes through the plenum chamber 24.

An air supply passage 50, provided by a tube 51 inserted in a bore in the plate 26, extends in the thickness of the distribution plate from a connection (not shown) with further air supply means operable to blow air into the air supply passage 50 and an exit 52 defined by the distribution plate 26 which opens upwardly and communicates, when the side portion 16 is above the plenum chamber, through a vertical passage 54 in the bottom plate 12, with a further cooling passage 60 in the side portion 16. In some circumstances the exit 52 may communicate directly with the passage 60 where the geometry of the situation allows the vertical passage 54 to be omitted. As can be seen in FIG. 1, the mould cavity 14 is oval in shape and the further cooling passage 60 is located in a thin portion of the mould close to the joining line of the side portions 16 and 18. When the illustrative mould arrangement is in use, the further air supply means can apply a higher pressure to the passage 50 than is applied to the plenum chamber 24 so that a greater flow of air is achieved in the cooling passage 60 than is achieved in the cooling passages 20 producing greater cooling in the region of the cooling passage 60. The pressure applied by the further air supply means can be varied to adjust the cooling effect as can the on and off times for the application of air to the passage 50 in each cycle of operation of the machine.

A further air supply passage 70, provided by a tube 71 in a bore in the distribution plate 26, extends in the thickness of the distribution plate 26 from a connection (not shown) with another air supply means (not shown) operable to blow air into the passage 70 and an exit 72 defined by the distribution plate 26 which opens upwardly and communicates, when the side portion 18 is above the plenum chamber 24, through a vertical passage 74 in the bottom plate 12 with three further cooling passages 80 formed in the side portion 18. The exit 72 is in the shape of a slot (see FIG. 1) which communicates with three vertical passages 74 in the bottom plate 12 and these in turn communicate with three vertical portions 80a of the vertical passages 80. Each portion 80a communicates with an inclined portion 80b which extends inwardly towards the mould cavity 14 and communicates with a vertical portion 80c of the passage 80. The arrangement is such that each cooling passage 80 extends upwardly to a point above the level of the top of the bottom plate 12 and then inwardly to a position close to the mould cavity 14 before extending upwardly to an exit formed in the top surface of the mould portion 18. The passages 80 are used, in similar manner to the passage 60 to provide increased cooling in the region in which they are formed. The ability to apply high air pressure to only a few of the cooling passages in the mould enables non-straight cooling passages to be used so that cooling can be brought to difficult regions without using the high pressure that is required to force the air through the non-straight passages in all the passages which would be wasteful in terms of energy and would create considerable noise.

I claim:

1. A mould arrangement for use in a cyclically operating glassware forming machine, the arrangement comprising a mould comprising a bottom plate defining a bottom portion of a cavity of the mould in which molten glass is moulded in the operation of the machine, and two side portions defining side portions of the cavity, each side portion being movable in a cycle of operation of the machine to a first portion thereof in which it engages the bottom plate and the other side portion to co-operate in defining the mould cavity so that moulding can take place and to a second position thereof in which the side portions are separated to allow moulded glass to be removed from the mould cavity, the side portions also defining cooling passages passing upwardly through the side portions through which air can pass to cool the side portions, the cooling passages in each side portion each having an entrance in a bottom surface of that side portion, and the mould arrangement also comprising a plenum chamber extending beneath the first or the second position of each side portion and having one or more exits which open upwardly and communicate, when the side portion is above the plenum chamber, either directly or through vertical passages in the bottom plate, with the entrances of the cooling passages so that air is supplied to each cooling passage at substantially the same pressure, the plenum chamber also having an entrance connected to air supply means operable to blow air into the plenum chamber, wherein the exit or exits of the plenum chamber are formed in a distribution plate which extends above the plenum chamber and beneath the bottom plate and at least one air supply passage extends in the thickness of the distribution plate from a connection with further air supply means operable to blow air into the air supply passage and an exit defined by the distribution plate which opens upwardly and communicates, when a side portion is above the plenum chamber, either directly or through a vertical passage in the bottom plate, with one or more further cooling passages in the side portion.

2. A mould arrangement according to claim 1, wherein the distribution plate is of reduced thickness in the regions where the exit or exits of the plenum chamber are formed.

* * * * *